United States Patent
Hittel et al.

(10) Patent No.: US 9,959,181 B2
(45) Date of Patent: May 1, 2018

(54) SYSTEM AND METHOD FOR CLOUD-SERVICE ASSET MANAGEMENT FOR PORTABLE COMPUTER TEST TOOLS

(71) Applicant: Fluke Corporation, Everett, WA (US)

(72) Inventors: John Paul Hittel, Scottsdale, AZ (US); Clinton J. Wooton, Lake Stevens, WA (US); David E. Bezold, Mukilteo, WA (US); Steve O'Hara, Poulsbo, WA (US)

(73) Assignee: Fluke Corporation, Everett, WA (US)

( * ) Notice: Subject to any disclaimer, the term of this patent is extended or adjusted under 35 U.S.C. 154(b) by 60 days.

(21) Appl. No.: 14/940,531

(22) Filed: Nov. 13, 2015

(65) Prior Publication Data

US 2017/0141966 A1    May 18, 2017

(51) Int. Cl.
| | |
|---|---|
| G06F 11/00 | (2006.01) |
| G06F 11/26 | (2006.01) |
| H04L 12/24 | (2006.01) |
| H04L 29/08 | (2006.01) |

(52) U.S. Cl.
CPC .............. *G06F 11/26* (2013.01); *H04L 41/14* (2013.01); *H04L 67/10* (2013.01)

(58) Field of Classification Search
CPC ...... G06F 11/26; G06F 11/263; G06F 11/273; G06F 11/3006; H04L 41/14; H04L 67/10
USPC ..................................................... 714/43, 26
See application file for complete search history.

(56) References Cited

U.S. PATENT DOCUMENTS

| | | | |
|---|---|---|---|
| 6,757,521 B1 | 6/2004 | Ying | |
| 6,823,479 B1 * | 11/2004 | McElhaney, Jr. ... | H04L 12/2697 714/4.2 |
| 6,847,916 B1 | 1/2005 | Ying | |
| 9,060,239 B1 | 6/2015 | Sinha et al. | |
| 2002/0144187 A1 * | 10/2002 | Morgan .............. | G06F 11/0748 714/43 |
| 2004/0015744 A1 * | 1/2004 | Klotz .................. | G06F 11/3414 714/43 |
| 2004/0203897 A1 | 10/2004 | Rogers | |
| 2004/0235562 A1 | 11/2004 | Kiely et al. | |
| 2005/0170892 A1 | 8/2005 | Atkinson | |
| 2006/0174034 A1 | 8/2006 | Shand et al. | |

(Continued)

FOREIGN PATENT DOCUMENTS

CN              201774541 U       3/2011

OTHER PUBLICATIONS

European Search Report for Application No. 16198510.6-1958, dated Mar. 27, 2017, 7 pages.

(Continued)

*Primary Examiner* — Joseph D Manoskey
(74) *Attorney, Agent, or Firm* — Seed IP Law Group LLP (57) ABSTRACT

A system for providing data communication includes a computer test tool configured to perform one or more diagnostic tests on a computer network and a cloud-based server. The cloud-based server is configured to couple to the communication network so as to exchange data with the computer test tool when the computer test tool is coupled to the communication network. The cloud-based server tracks usage of the computer test tool and, based on the tracked usage, transmits a message to the computer test tool that temporarily enables the computer test tool based on a predetermined condition.

20 Claims, 5 Drawing Sheets

(56) References Cited

U.S. PATENT DOCUMENTS

| | | | |
|---|---|---|---|
| 2013/0007245 A1 | 1/2013 | Malik et al. | |
| 2013/0211546 A1 | 8/2013 | Lawson et al. | |
| 2014/0292348 A1 | 10/2014 | Kanne et al. | |
| 2014/0337674 A1* | 11/2014 | Ivancic | H04L 43/50 714/43 |
| 2015/0195182 A1* | 7/2015 | Mathur | H04L 43/50 714/27 |
| 2015/0350095 A1* | 12/2015 | Raney | H04L 47/2441 709/223 |
| 2016/0072693 A1* | 3/2016 | Michaelis | H04L 43/50 709/203 |

OTHER PUBLICATIONS

Communication pursuant to Article 94(3) EPC, dated Feb. 6, 2018, for European Application No. 16 198 510.6-1222, 8 pages.

* cited by examiner

SYSTEM AND METHOD FOR CLOUD-SERVICE ASSET MANAGEMENT FOR PORTABLE COMPUTER TEST TOOLS

FIELD OF THE INVENTION

The disclosed embodiments generally relate to a system and method for test equipment monitoring, and more particularly, to a secure system and method for communication between a computer test tool and a cloud-based server.

BACKGROUND OF THE INVENTION

Computer test tools are typically portable tools that are valuable assets to their owner. The portability of a computer test tool impacts the ability to know the whereabouts of the tool, the nature of the usage of the tool, the operating condition of the tool, and whether the tool is under the dominion of an authorized person.

In addition, the owner may desire to schedule use of the computer test tool by different users and/or at different locations at selected times. Although the portability of the computer test tool allows for such scheduling, many factors need to be coordinated. Further, challenges arise in tracking usage of a tool and associated metrics when a tool is used by different users and at different geographic locations. Such metrics can be used to monitor how usage of the tool is affecting the longevity and value of the tool and the value of commercial operations.

Accordingly, there is a need for management of portable computer test tools to monitor whether usage is authorized, schedule economic usage of the computer test tools in project workflows, and monitor how usage affects the longevity and value of the tool and the value of commercial operations.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a system for providing data communication is described in which the system includes a computer test tool configured to perform one or more diagnostic tests on a computer network and a cloud-based server. The cloud-based server is configured to couple to the communication network so as to exchange data with the computer test tool when the computer test tool is coupled to the communication network. The cloud-based server tracks usage of the computer test tool and, based on the tracked usage, transmits a message to the computer test tool that temporarily enables the computer test tool based on a predetermined condition.

In embodiments, the computer test tool can include a location sensor that senses a location of the computer test tool and outputs location data, and the tracked usage can include the location data. The computer test tool can record operation data indicative of operations performed by the computer test tool, wherein the tracked usage can include the operation data. The computer test tool can record user data indicative of one or more users that have operated the computer test tool, and the tracked usage can include the user data. The tracked usage can be based on a comparison between the time, location data, the operation data, and the user data, and a schedule of authorized usage of the computer test tool, wherein the schedule of authorized usage can include at least one of authorized locations, times, operations, and users that prescribe authorized usage of the computer test tool.

The cloud-based server can access a workflow schedule that includes a time and location of operations that the computer test tool is configured to perform in accordance with a workflow. The cloud-based server can generate a schedule of usage of the computer test tool based on the workflow schedule and the location data. The cloud-based server can track efficiency of a user that used the tool based on the user data and the usage data. The cloud-based server can track value associated with the computer test tool based on the usage data and a billing schedule that associates uses of the tool to a value. The cloud-based server can track depreciation of the computer test tool based on the location data, the usage data, and a depreciation schedule that correlates usage of computer test tool to depreciation in value of the computer test tools.

In embodiments, the computer test tool can record diagnostic data indicating malfunction of a component, maintenance performance, calibration performance, and the cloud-based server further tracks the diagnostic data. The cloud-based server can compare the diagnostic data to warranty data associated with the computer test tool and determine if a repair of a malfunction indicated by the diagnostic data is covered by warranty.

In embodiments, the computer test tool can submit a request to the cloud-based server requesting authorization to perform a specified operation, wherein the request can specify a requested operation, time of performance, location of performance, and user, wherein the specified operation based on the request may be otherwise not authorized, and the cloud-based server can respond with an authorization that authorizes the computer test tool to perform the specified operation as requested. The authorization can limit performance of the specified operation to at least one of a specified location area, time period, and one or more users. The request can be submitted automatically in response to the specified operation being unauthorized by the cloud-based server.

In embodiments, the computer test tool can exchange information between the cloud-based server and a computer test tool that is not coupled to the communication network to enable the cloud-based server to track usage of the uncoupled computer test tool and, based on the tracked usage, can transmit a message to the uncoupled computer test tool that temporarily enables the uncoupled computer test tool based on a predetermined condition.

In embodiments, the computer test tool can exchange information between the cloud-based server and a module installed in the computer test tool to enable the cloud-based server to track usage of the module and, based on the tracked usage, can transmit a message to the module that temporarily enables the module based on a predetermined condition.

In further, optional aspects, a cloud-based server for providing data communication is described in which the cloud-based server includes a memory configured to store executable instructions and a processor disposed in communication with the memory. The processor upon execution of the instructions is configured to couple to a communication network so as to exchange data with a computer test tool when the computer test tool is coupled to the communication network, wherein the computer test tool performs one or more diagnostic tests on a computer network, tracks usage of the computer test tool, and based on the tracked usage, transmit a message to the computer test tool that temporarily enables the computer test tool based on a predetermined condition.

In embodiments, the tracked usage can include at least one of location data indicative of a sensed location of the computer test tool, operation data indicative of operations performed by the computer test tool, and user data indicative of one or more users that have operated the computer test tool. The tracked usage can be based on a comparison between the time, location data, the operation data, and the user data, and a schedule of authorized usage of the computer test tool. The schedule of authorized usage can include at least one of authorized locations, times, operations, and users that prescribe authorized usage of the computer test tool. The cloud-based server can access a workflow schedule that includes a time and location of operations that the computer test tool is configured to perform in accordance with a workflow, and can generate a schedule of usage of the computer test tool based on the workflow schedule and the location data.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Figure 1:
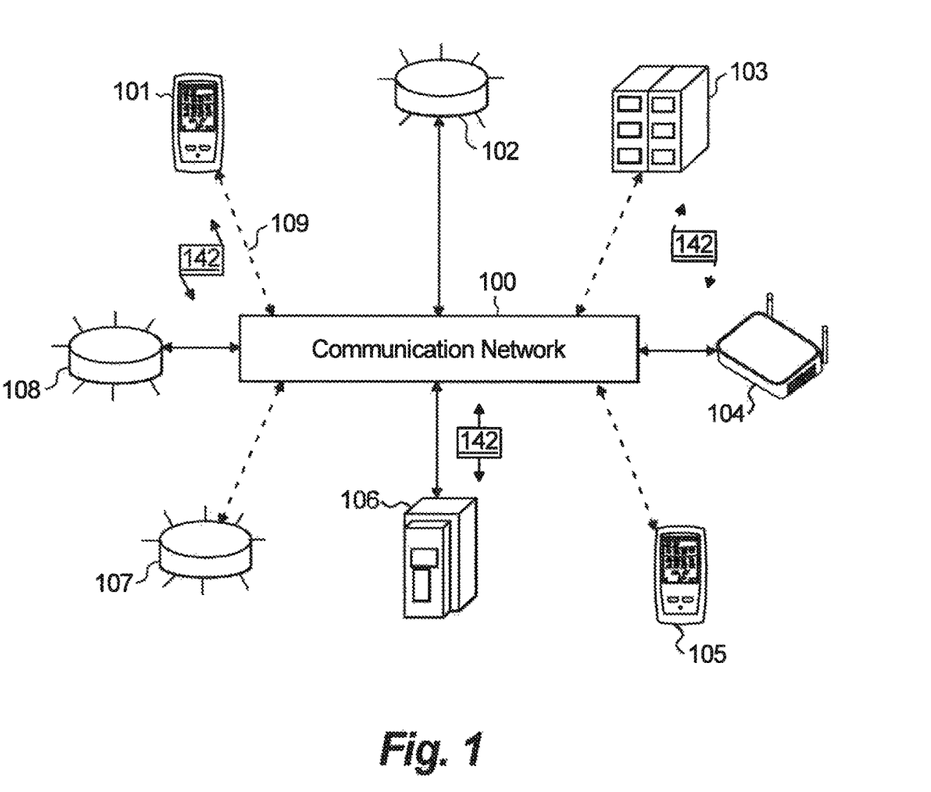
FIG. 1 illustrates an example communication network.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, web servers 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
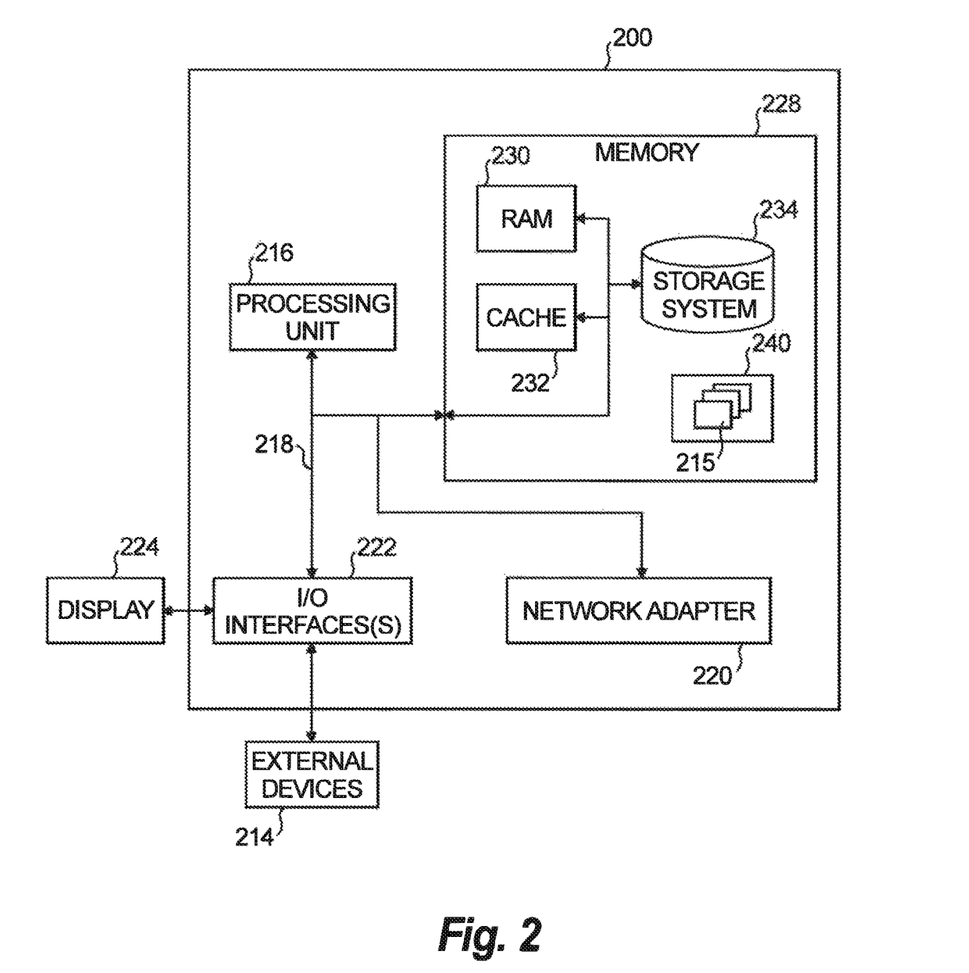
FIG. 2 illustrates an example network device/node.

FIG. 2 is a schematic block diagram of an example network computing device 200 (e.g., client computing device 103, server 106, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of the present invention. Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

In the description that follows, certain embodiments may be described with reference to acts and symbolic representations of operations that are performed by one or more computing devices, such as the computing system environment 200 of FIG. 2. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
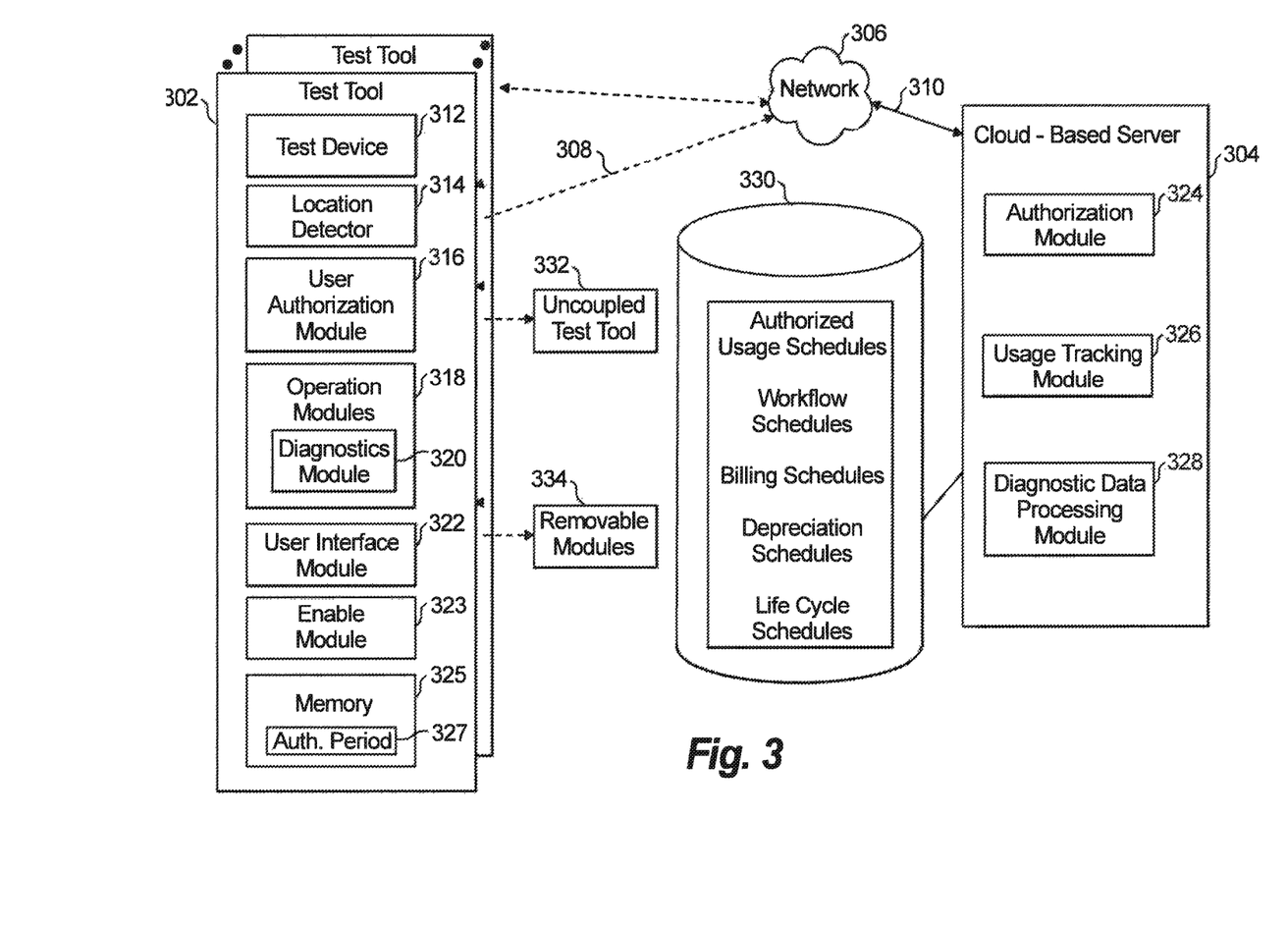
FIG. 3 is a flow diagram that illustrates a cloud-assisted diagnostic system in accordance with illustrated embodiments.
Figure 4:
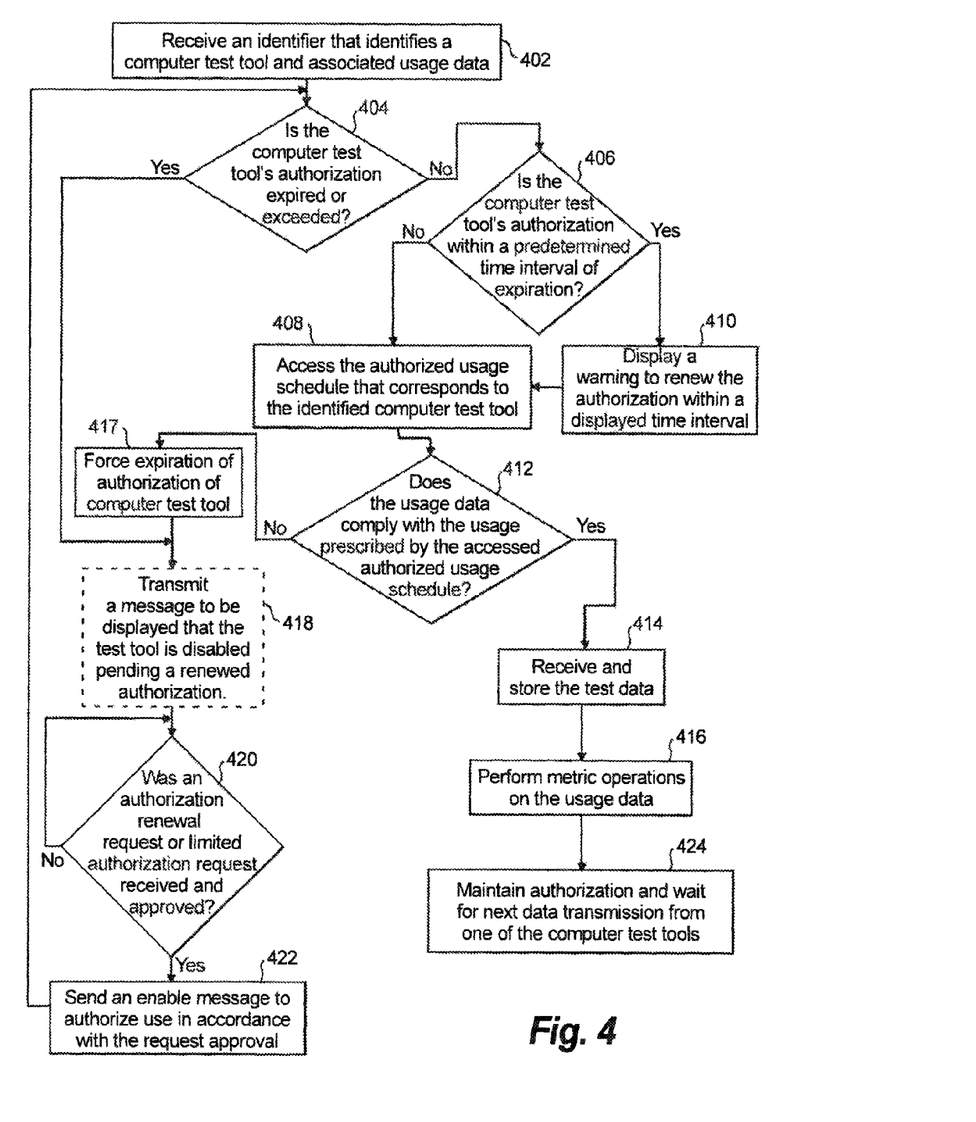
FIG. 4 is a flowchart illustrating a method performed by a cloud-based server to monitor usage of computer test tools and control authorization of use of the computer test tools in accordance with illustrated embodiments.
Figure 5:
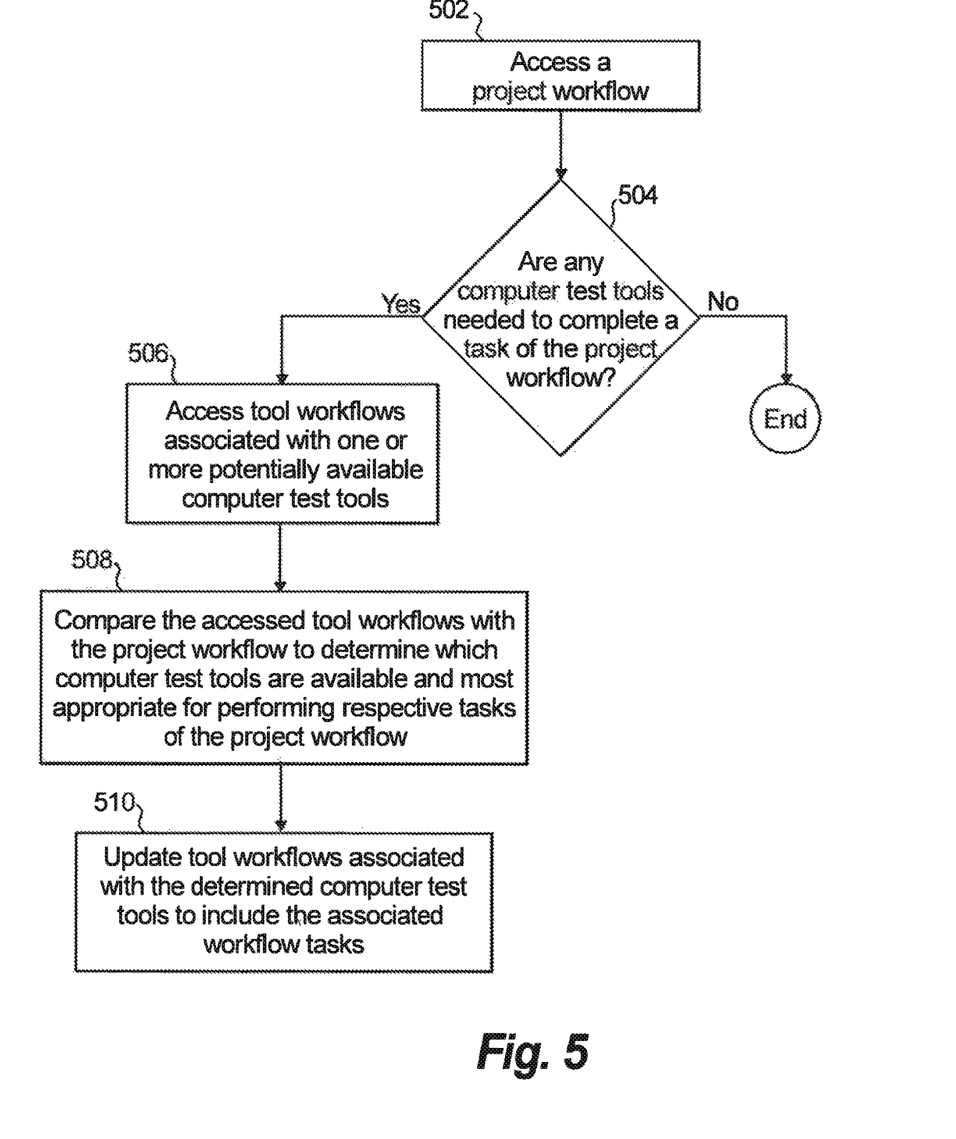
FIG. 5 is a flowchart illustrating a method performed by the cloud-based server to coordinate usage of the computer test tools for performing tasks included in a project workflow in accordance with illustrated embodiments.

With the exemplary communication network 100 (FIG. 1) and computing device 200 (FIG. 2) being generally shown and discussed above, description of certain illustrated embodiments of the present invention will now be provided. With reference now to FIGS. 3-5, a cloud-assisted computer testing system 300 is generally shown in which a plurality of computer test tools 302 communicate with a cloud-based server 304, wherein the cloud-based server 304 authorizes operation of the computer test tools 302 based on usage of the computer test tool 302 and/or usage criteria. Additionally, the cloud-based server 304 can track usage of each computer test tool 302 for determining metrics, such as economic efficiency of the computer test tool 302 and its users, devaluation of the computer test tool 302, and warranty compliance of the computer test tool 302. In an embodiment, the computer test tools 302 communicate indirectly with a cloud-based server 304 via a communication device (not shown), such as a mobile phone, tablet, or laptop computer.

An example computer test tool 302 is a portable tool than can include a computer system that functions as a node (e.g., nodes 101-105, 107, or 108) of a network 306, wherein network 306 is similar to communication network 100 shown in FIG. 1. Similarly, the server 304 can be a web server that includes a computer system that functions as a node (e.g., node 106) of network 306.

The computer test tool 302 communicates with the network 306 using a first communication link 308, and the server 304 communicates with the network 306 using a second communication link 310. The first and second communication links 308, 310 can each include a single or multiple wired and/or wireless links. In embodiments, some of these links use near-field communication, such as radio frequency identification (RFID), Bluetooth, infrared communication, or the like. In embodiments, the network 306 includes the Internet. As indicated by the dotted lines, the computer test tool 302 can be selectively coupled to the network 306 so that the first communication link 308 can be intermittent, e.g., disrupted and reestablished. The second communication link 310 can be stable and readily available during operation times for communicating with the computer test tool 302.

The computer test tool 302 and the cloud-based server 304 can each be configured similarly to the network computing device 200 shown in FIG. 2, such as to include a processing unit 216, a network adapter 220, an I/O interface 222, and memory 228.

The computer test tool 302 is a portable device that includes a test device 312, a location detector 314, a user authorization module 316, an operation module 318, a user interface module 322, a diagnostics module 320, an enable module 323, and a memory 325. Examples of such a test tool 302, include, and are not limited to the flowing Fluke Network® instruments: OptiFiber® Pro OTDR; CertiFiber® Pro Optical Loss Test Set and the DSX-5000 CableAnalyzer™.

The location detector 314, user authorization module 316, operation module 318, user interface module 322, diagnostics module 320, and enable module 323 can include software modules (e.g., program modules 215 stored by memory 228 of the server 304). The location detector 314 senses a location of the computer test tool 302. The location detector 314 can include a Global Positioning System (GPS) sensor. In embodiments, the location detector 314 can include sensors that detect a characteristic, such as an optical code or RFID code, associated with a fixed device having a known location. The memory 325 can be comparable to system memory 228 or a portion thereof.

Additionally, in embodiments, the location detector 314 can be external from the computer test tool 302, and/or included in the cloud-based server 304. In an embodiment, the location detector 314 can be associated with a fixed device having a known location that senses the presence of the computer test tool 302, e.g., using optical sensing, RFID, Bluetooth, etc. Further, in embodiments, the location detector 314 can include logic to infer location of the computer test tool 302 from network signals such as IP address, RFID, WiFi and Bluetooth MAC addresses, and/or a GSM/CDMA cell ID associated with the computer test tool 302. The location detector 314 outputs time-stamped location data indicative of a location of the computer test tool 302. The location data can include geolocation data and/or a position of the computer test tool 302 inside a building, such as relative to a floor map.

The user authorization module 316 receives user identification information that can be used by the computer test tool 302 or the cloud-based server 304 to authorize the user to operate the computer test tool 302. The user identification information can include a username and password, which can be entered, e.g., via a user input device, such as keyboard or touchscreen associated with the user interface module 322. Alternatively or additionally, the user identification information can include biometric information, such as fingerprint, retinal scan, voice scan, etc., that can sensed by a biometric sensor which may be included with the computer test tool 302. The user authorization module 316 outputs time-stamped user data that identifies a user that has been authorized to use the computer test tool 302.

The operation module 318 includes a variety of submodules used for respective operations of the computer test tool 302. The submodules can include, for example, an operation to perform cable testing operations, such as optical time domain reflectometry (OTDR) testing, optical loss/length testing, and/or copper certification testing; execute a cellular phone call; measure a physical property using the test device 312; perform diagnostic testing of the computer test tool 302; couple to a cloud-based server; and couple to another test tool or test tool module (which may or may not have capabilities for communicating with a network such as the Internet). The operation module 318 can output time-stamped operation data that indicates which operations were performed by the computer test tool 302.

The diagnostics submodule 320 performs the diagnostic testing, which can include detecting malfunction of a component of the computer test tool 302, calibrating the test device 312, performing or logging of maintenance tasks performed on the computer test tool 302. The diagnostics module 320 outputs time-stamped diagnostics data that indicates which diagnostic operations were performed and results of the diagnostic operations, such as which components malfunctioned.

The user interface module 322 provides a user interface for receiving input from a user, via a user input device, such as a keypad or touch screen. The user interface module 322 can further and communicate information to the user, such as via a display device and/or an audio device.

The enable module 323 can access the authorization period 327 stored by the memory 325 and determine a time-to-expiration of the authorization period. The time-to-expiration is the amount of time that remains until the timing restriction associated with the authorization expires. When the time-to-expiration is greater than zero, the enable module 323 causes the computer test tool 302 to be in an enabled node in which the modules of the computer test tool 302 are enabled to operate.

When the time-to-expiration is zero, the enable module 323 causes the computer test tool 302 to be in a disabled mode (e.g., bricked) in which the modules of the computer test tool 302 are disabled, and only permitted to perform minimal operations. For example, in the disabled mode, the computer test tool 302 is operatively limited to receiving and displaying messages from the cloud-based server 304 and requesting authorization (e.g., authorization renewal or a limited authorization) from the cloud-based server 304. The enable module 323 can also submit a renewal request to the cloud-based server 304 to request authorization renewal. The cloud-based server 304 includes an authentication module 324, a usage tracking module 326, and a diagnostic data processing module 328, each of which can include software modules (e.g., program modules 215 stored by memory 228 of the server 304). The cloud-based server 304 is coupled to a database 330 that stores information for a plurality of computer test tools that can couple to the cloud-based server 304 via network 306. Information stored by the database 330 can include, for example, authorized usage schedules, workflow schedules, billing schedules, depreciation schedules, and life cycle schedules. The authorized usage schedules prescribe authorized usage of a computer test tool 302, such as which usage factors or combination of usage factors are authorized in connection with using an identified computer test tool 302. The usage factors can include, for example users, times of use, locations of use, and which operations.

The workflow schedule includes project workflows associated with respective projects and tool workflows associated with the individual computer test tools 302. A project workflow can specify a schedule of tasks to be performed, including the order of the tasks, a timeframe, location, and operations to be performed for the respective tasks. The tool workflow for a computer test tool 302 indicates a schedule for the computer test tool 302, including a time and location at which the computer test tool 302 is scheduled to be used. The tool workflow can also prescribe the operations to be performed and the user(s) prescribed to perform the operation.

The billing schedule indicates a value for operations that can be performed by the computer test tools 302. The value can be tied to an amount that a customer is willing to pay for services performed using the computer test tools 302. The values can be specific to various conditions, such as in association with which clients or geographical regions the operation is to be performed. The depreciation schedule indicates a depreciation of value of the computer test tools 302 for operations that can be performed by the respective computer test tools 302. The life cycle schedules specify maintenance tasks to be performed, including calibration of the test device 312, and warranty data. The warranty data specifies conditions for satisfying a warranty, e.g., maintenance requirements, effective dates of warranty, or limitations on usage, such as number of times an operation can be performed by the computer test tool 302 while under warranty.

The authentication module 324 monitors usage of a plurality of computer test tools 302 and can temporarily enable a computer test tool 302 based on predetermined conditions that expire and/or define authorized usage as prescribed in the authorized usage schedules. For example, a particular user may only be authorized to use a particular computer test tool 302 during work hours of Monday-Friday in a work territory assigned to that user for assigned work tasks. Special authorization is needed in order to use the computer test tool 302 by another user or outside of the prescribed time, locations, and operations.

With reference now to FIGS. 4 and 5, shown are flowcharts demonstrating implementation of the various exemplary embodiments. It is noted that the order of operations shown in FIGS. 4 and 5 is not required, so in principle, the various operations may be performed out of the illustrated order. Also certain operations may be skipped, different operations may be added or substituted, or selected operations or groups of operations may be performed in a separate application following the embodiments described herein.

FIG. 4 shows a flowchart of operations performed in accordance with a method of the disclosure when receiving test data from a computer test tool 302 and authorizing use of the computer test tool 302. At operation 402, the cloud-based server 304 receives from a computer test tool 302 an identifier that identifies the computer test tool 302, and usage data, which can include time-stamped user data, location data, and operation data. At operation 404, a determination is made whether the computer test tool's 302 authorization is expired. If the determination at operation 404 is YES, then the method continues at operation 418. If the determination at operation 404 is NO, the method continues at operation 406. At operation 406, a determination is made whether the computer test tool's 302 authorization is within a predetermined time interval of expiration. If the determination at operation 406 is YES, then at operation 410 a warning is displayed on a display device of the computer test tool 302 informing the user that the authorization must be renewed within a displayed time interval, after which operation 408 is executed. If the determination at operation 406 is NO, the method continues at operation 408.

At operation 408, usage criteria, such as the authorized usage schedule that corresponds to the identified computer test tool 302, is accessed. At operation 412, a determination is made whether the usage data complies with the usage prescribed by the accessed authorized usage schedule. If the determination at operation 412 is YES, at operation 414 the test data is received from the computer test tool 302 and stored, e.g., in database 330. At operation 416, metric operations are performed on the usage data. The method continues at operation 424.

The metrics operations can be used to monitor how usage of the tool is affecting the longevity and value of the tool and the value of associated commercial operations. The metric operations can include, for example, determining and storing in association with the identified computer test tool 302 depreciation in value based on the usage data and the depreciation schedule, value generated in accordance with the usage data and the billing schedule, and warranty compliance based on the usage data and the date associated with the usage data. The metric operations can further include, for example, determining and storing in association with the identified user, user performance efficiency based on, for instance: the identified computer test tool 302, the time of usage, and the operation performed.

If the determination at operation 412 is NO, the method continues at operation 417. At operation 417, the computer test tool 302 expiration of the computer test tool's 302 current authorization period is forced, which causes the computer test tool 302's enable module 323 to transition the computer test tool 302 to a disabled mode. In an embodiment, the expiration can be forced by sending a control message to the computer test tool 302 that causes the enable module 323 to reset the computer test tool's 302 calculated time-to-expiration of the authorization. The enable module 323 then determines that the authorization period has expired and transitions the computer test tool's 302 mode from an enabled mode to a disabled mode. In order to transition back to an enabled mode, an authorized user of the computer test tool 302 can request that a new enable message be provided by the cloud-based server 304. Authorization of the user can be performed by the computer test tool 302 and/or the cloud-based server 304. Pending any authorization of the user by the computer test tool 302, the computer test tool 302 can send an authorization renewal request to the cloud-based server 304.

In another embodiment, the expiration can be forced by sending a control message to the computer test tool 302 that causes the enable module 323 to reset the prescribed authorization period to "0". In order to transition back to an enabled mode, an authorized user of the computer test tool 302 can request that the authorization period be reset to a requested value. Authorization of the user can be performed by the computer test tool 302 and/or the cloud-based server 304. If the cloud-based server 304 approves the request, the cloud-based server 304 can transmit a control message to the computer test tool 302 to reset the authorized period. The cloud-based server 304 can also send an enable message to the computer test tool 302 that prompts the enable module 323 to transition the computer test tool 302 to an enabled mode.

At operation 418, a message can optionally (as indicated by the dashed lines) be transmitted that can be displayed by the computer test tool 302 that indicates the computer test tool 302 is in a disabled mode pending a renewed authorization. The computer test tool 302 is in a disabled mode since authorization is no longer in effect due to expiration of the authorization time period or noncompliance with the authorized usage schedule. The computer test tool 302 can remain in the disabled mode until a renewed authorization is received from the cloud-based server 304.

At operation 420, a determination is made whether a renewal request or a limited authorization request was received and approved. If the determination at operation 420 is NO, the method returns to operation 420, forming a wait loop that can be exited when a renewal request or a limited authorization request is received and approved.

If the determination at operation 420 is that a renewal request or a limited authorization request has been received and approved, then at operation 422 an enable message is transmitted to the computer test tool 302 that authorizes the computer test tool 302 to transition to an enabled mode. The method can continue at operation 404 wherein the computer test tool 302 can continue to operate in an enabled mode in accordance with the approved request until the computer test tool's 302 limited authorization is determined to be expired or exceeded at operation 404.

The request for limited authorization can include a request to operate the computer test tool 302 with limitations that are additional to those prescribed by the associated authorized usage schedule for the computer test tool 302. For example, operation of the computer test tool 302 can be limited to a particular user or group of users, a particular one or more uses, a particular geographic region, and/or for a limited time period. Approval of the request can include modification and approval of the request.

At operation 424, the cloud-based server 304 waits for the next data transmission for one of the computer test tools 302, upon which the method would continue at operation 402. The data transmissions received at operation 424 are from enabled computer test tools 302, since a computer test tool 302 that is in a disabled mode does not send data transmissions to the cloud-based server 304.

Thus, in accordance with the method illustrated in FIG. 4, when the computer test tool's 302 authorization period has expired or been exceeded, the computer test tool 302 is inoperable, other than to request renewal or an expanded authorization. A computer test tool 302 that is being used without proper authorization, such as due to theft or for personal use, will soon become useless upon expiration of the authorization period or detection that authorization has been exceeded.

FIG. 5 shows a flowchart of operations performed in accordance with a method of the disclosure to arrange usage or a computer test tool 302 based on a project workflow schedule and the workflow schedule associated with the computer test tool 302. At operation 502, a project workflow is accessed. At operation 504, a determination is made whether any computer test tools 302 are needed to complete a task of the project workflow. If the determination at operation 504 is YES, at operation 506, workflows associated with one or more potentially available computer test tools 302 (tool workflows) are accessed, and the method continues at operation 508. If the determination at operation 504 is NO, the method ends.

At operation 508, the tool workflows are compared with the project workflow to determine which computer test tools 302 are available and most appropriate for performing respective tasks of the project workflow. At operation 510, the tool workflows associated with each computer test tool 302 determined to be available and most appropriate for participating in the workflow project tasks are updated to include the associated workflow tasks.

In an embodiment, the computer test tool 302 can exchange information between the cloud-based server 304 and a computer test tool 332 that is not coupled to the communication network 306. For example, the uncoupled computer test tool 332 can be equipped with limited communication capabilities and/or does not have the capability to couple to the Internet independently. For instance, the uncoupled computer test tool 332 may be configured to communicate with a LAN, such as via local wired or wireless communication. The wireless communication can include, for example, NEC wireless communication, e.g., Bluetooth or RIM communication, and the wired communication can include communication links such as USB or Ethernet cables.

However, the uncoupled computer test tool 332 may be incapable, such as due to hardware or software constraints, from communicating with a different network, the Internet, and/or the cloud-based server 304. The computer test tool 302 can communicate with the uncoupled computer test tool 332 and with the cloud-based server 304, and thus enable the cloud-based server 304 to track usage of the uncoupled computer test tool 332. In addition, if the cloud-based server 304 determines that the uncoupled computer test tool 332 is being used improperly, such as by an unauthorized user, at an unauthorized location, at an unauthorized time, or for an unauthorized operation, the cloud-based server 304 can transmit a control message to the uncoupled computer test tool 332 via the computer test tool 302 that disables the uncoupled computer test tool 332.

Furthermore, in an embodiment, the computer test tool 302 can exchange information between the cloud-based server 304 and a removable computer module 334 having at least one interface that is configured to couple to the computer test tool 302. The interface can include a communication interface that couples with a mating interface of the computer test tool 302 for exchanging data there between. The interface can include a wired connector that has, for example, pins or metal contacts, or a wireless connector that uses, for example, optical, infrared, Bluetooth, MAD, or other NEC connectors. In an embodiment, the removable computer module 334 is removably mounted to the computer test tool 302 and adds functionality to the computer test tool 302. The computer test tool 302 can be compatible with multiple removable computer modules 334 that can be mounted to and removed from the computer test tool 302 individually or in combination. The removable computer modules 334 can be autonomous modules that can operate independently from the computer test tool, or may be operational only when mounted to the computer test tool 302.

The removable computer module 334 may be incapable of independently communicating with the network 306. The computer test tool 302 can communicate with the removable computer module 334 and the cloud-based server 304 to enable the cloud-based server 304 to track usage of the removable computer module 334. In addition, if the cloud-based server 304 determines that the removable computer module 334 is being used improperly, such as with an unauthorized computer test tool 302, by an unauthorized user, at an unauthorized location, at an unauthorized time, or for an unauthorized operation, the cloud-based server 304 can transmit a control message to the removable computer module 334 that disables the removable computer module 334.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A system for providing data communication, comprising:
    a portable computer test tool device configured to perform one or more diagnostic tests on a communication network; and
    a cloud-based server configured to couple to the communication network so as to exchange data with the portable computer test tool device when the portable computer test tool device is coupled to the communication network, the cloud-based server being separate from the portable computer test tool device, wherein the cloud-based server tracks usage of the portable computer test tool device and, based on the tracked usage, transmits a message to the portable computer test tool device that temporarily enables the portable computer test tool device based on a predetermined condition.

2. The system of claim 1, wherein the portable computer test tool device includes a location sensor that senses a location of the portable computer test tool device and outputs location data, and the tracked usage includes the location data.

3. The system of claim 2, wherein the cloud-based server accesses a workflow schedule that includes a time and location of operations that the portable computer test tool device is configured to perform in accordance with a workflow, and generates a schedule of usage of the portable computer test tool device based on the workflow schedule and the location data.

4. The system of claim 1, wherein the portable computer test tool device records operation data indicative of operations performed by the portable computer test tool device, wherein the tracked usage includes the operation data.

5. The system of claim 4, wherein the portable computer test tool device records user data indicative of one or more users that have operated the portable computer test tool device, and the tracked usage includes the user data.

6. The system of claim 5, wherein:
    the portable computer test tool device includes a location sensor that senses a location of the portable computer test tool device and outputs location data, and the tracked usage includes the location data, and
    the tracked usage is based on a comparison between time, the location data, the operation data, and the user data, and a schedule of authorized usage of the portable computer test tool device, the schedule of authorized usage including at least one of authorized locations, times, operations, and users that prescribe authorized usage of the portable computer test tool device.

7. The system of claim 5, wherein the cloud-based server tracks efficiency of a user that used the portable computer test tool device based on the user data and the tracked usage.

8. The system of claim 4, wherein the cloud-based server tracks value associated with the portable computer test tool device based on the tracked usage and a billing schedule that associates uses of the portable computer test tool device to a value.

9. The system of claim 4, wherein:
    the portable computer test tool device includes a location sensor that senses a location of the portable computer test tool device and outputs location data, and the tracked usage includes the location data, and
    the cloud-based server tracks depreciation of the portable computer test tool device based on the location data, the tracked usage, and a depreciation schedule that correlates usage of portable computer test tool devices to depreciation in value of the portable computer test tool devices.

10. The system of claim 1, wherein the portable computer test tool device records diagnostic data indicating malfunction of a component, maintenance performance, or calibration performance, and the cloud-based server further tracks the diagnostic data.

11. The system of claim 10, wherein the cloud-based server compares the diagnostic data to warranty data associated with the portable computer test tool device and determines if a repair of a malfunction indicated by the diagnostic data is covered by warranty.

12. The system of claim 1, wherein the portable computer test tool device submits a request to the cloud-based server requesting authorization to perform a specified operation, wherein the request specifies a requested operation, time of performance, location of performance, and user, wherein the specified operation based on the request is otherwise not authorized, and the cloud-based server responds with an authorization that authorizes the portable computer test tool device to perform the specified operation as requested.

13. The system of claim 12, wherein the authorization limits performance of the specified operation to at least one of a specified location area, time period, and one or more users.

14. The system of claim 12, wherein the request is submitted automatically in response to the specified operation being unauthorized by the cloud-based server.

15. The system of claim 1, wherein the portable computer test tool device exchanges information between the cloud-based server and a portable computer test tool device that is not coupled to the communication network to enable the cloud-based server to track usage of the uncoupled portable computer test tool device and, based on the tracked usage of the uncoupled portable computer test tool device, transmits a message to the uncoupled portable computer test tool device that temporarily enables the uncoupled portable computer test tool device based on a predetermined condition.

16. The system of claim 1, wherein the portable computer test tool device exchanges information between the cloud-based server and a module installed in the portable computer test tool device to enable the cloud-based server to track usage of the module and, based on the tracked usage of the module, transmits a message to the module that temporarily enables the module based on a predetermined condition.

17. A cloud-based server for providing data communication, comprising:
a memory configured to store executable instructions; and
a processor disposed in communication with said memory, wherein said processor upon execution of the instructions is configured to:
couple to a communication network so as to exchange data with a portable computer test tool device when the portable computer test tool device is coupled to the communication network, wherein the portable computer test tool device is separate from the cloud-based server and performs one or more diagnostic tests on a computer network;
track usage of the portable computer test tool device; and
based on the tracked usage, transmit a message to the portable computer test tool device that temporarily enables the portable computer test tool device based on a predetermined condition.

18. The cloud-based server of claim 17, wherein the tracked usage includes at least one of location data indicative of a sensed location of the portable computer test tool device, operation data indicative of operations performed by the portable computer test tool device, and user data indicative of one or more users that have operated the portable computer test tool device.

19. The cloud-based server of claim 18, wherein the tracked usage is based on a comparison between time, the location data, the operation data, and the user data, and a schedule of authorized usage of the portable computer test tool device, the schedule of authorized usage including at least one of authorized locations, times, operations, and users that prescribe authorized usage of the portable computer test tool device.

20. The cloud-based server of claim 18, wherein the cloud-based server accesses a workflow schedule that includes a time and location of operations that the portable computer test tool device is configured to perform in accordance with a workflow, and generates a schedule of usage of the portable computer test tool device based on the workflow schedule and the location data.

* * * * *